A. T. SAUNDERS.
TENNIS BALL.
APPLICATION FILED DEC. 4, 1919.
Reissued Mar. 30, 1920.
14,832.
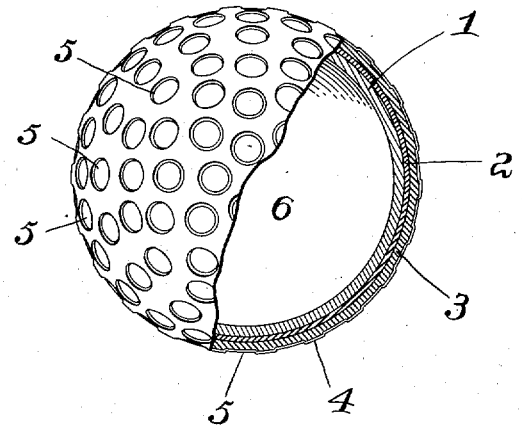
Inventor:
Addison T. Saunders,
by Spear, Middleton, Douglass & Hall
Atty's.

UNITED STATES PATENT OFFICE.

ADDISON T. SAUNDERS, OF CHICOPEE, MASSACHUSETTS, ASSIGNOR TO A. G. SPALDING & BROS., OF JERSEY CITY, NEW JERSEY, A CORPORATION OF NEW JERSEY.

TENNIS-BALL.

14,832. Specification of Reissued Letters Patent. Reissued Mar. 30, 1920.

Original No. 1,287,766, dated December 17, 1918, Serial No. 247,604, filed July 31, 1918. Application for reissue filed December 4, 1919. Serial No. 342,514.

*To all whom it may concern:*

Be it known that I, ADDISON T. SAUNDERS, a citizen of the United States, and resident of Chicopee, Massachusetts, have invented certain new and useful Improvements in Tennis-Balls, of which the following is a specification.

My invention relates to playing balls for the game of tennis.

The general object of my invention is to produce a tennis ball which, while possessing all the desirable qualities of the present type as to behavior in play, will obviate the use of the usual covering of felt and thus avoid the distortion so generally produced in tennis balls in the act of laying on the covers, or by the uneven stretching of the sections thereof, as is evidenced by the flat sides which frequently exist, and which cause uneven and off direction plays.

Other objects are to secure greater uniformity of character and behavior—enable greater accuracy of play, increase durability or wearing qualities, make the ball waterproof and washable, render it capable of better retaining the compressed air, and susceptible of manufacture at a lower cost than the balls are now made.

The common type of tennis ball comprises a so-called "center" consisting of a hollow ball having but a thin wall composed of a vulcanized rubber compound of such character as to resist undue distention by the charge of compressed air employed therein, while possessing the desired distortability and resiliency under impact which operates in conjunction with that of the compressed air, said center having the property of retaining, in a degree, the air charge, and a cover consisting of sections of felt cemented to, and sewed together around this center.

Functions of the usual felt cover are to afford a surface which slightly grips or clings to the gut of the racket in cut shots, aid control, offer by "skin friction" a certain resistance to the air in flight, reinforce the center and give the desired light color.

The felt cover and the cement therefor make up a considerable part of the total weight of the finished ball thus limiting the weight, and hence the thickness, of the wall of the center admissible under the regulations.

Aside from the high cost of the material, the employment of a cover of felt involves numerous objectionable features. No thread has been made or found for stitching together the sections of the cover which has sufficient strength to withstand the harder blows of the racket when spun to the fineness of size required to avoid bad seams. It is well known that when played by strong expert players some stitches usually break out with a few blows and that the cover is raised at these points, not only being unsightly but affecting unfavorably the action of the ball in play.

As will be understood the common tennis center, or a modification thereof, by increase in weight to the total weight desired, or regulation weight for a ball, will not give satisfactory playing qualities without a cover.

In my improved ball the felt cover is omitted and the functions thereof are performed by an outer layer of a rubber compound, of a softer character than that of the center and this outer covering while meeting all the requirements in play avoids the objections which exist to the use of the felt covering.

A preferred form of my invention is illustrated in the accompanying drawing in which, 1 indicates a tennis center of the usual character; 2 a layer of fiberized rubber compound; 3 a layer of rubber compound of a softer character than that of the center; 4 a coating of rubber paint, and 5, 5, 5, depressions forming a part of a system of depressed marking for the surface of the ball; 6 the interior space for compressed air.

The "dimple" markings may be saucer-like depressions of circular form about ¼″ in diameter and about .015″ deep. They may be somewhat closer together and staggered instead of in rows. They may be made considerably smaller with proportionate spaces between. In practice I may make them flat bottomed and with sides at an angle of about forty-five degrees.

When making a ball in accordance with the above I prefer to first make up and vulcanize in a suitable mold a center of the usual compound and character. I may inflate this in the mold if made by the twopiece method, or I may attach a plug or plurality of plugs at opposite points—on the interior and inflate later in the well known manner through a hollow needle inserted through the plug—or one of the plugs. If I employ two plugs the second is to balance the usual one. I may slightly lessen the cure of this center from that required for a finished center to allow for the later cure described below.

This center is buffed in the usual way to prepare it for adhesion of a suitable cement which is next applied. This cement is to cohere the center 1 and the layer of fiberized rubber compound 2, which I prefer to make of a nearly pure gum and sulfur mixture with finely divided cotton fiber in as great proportion as practicable. This fiberized compound is sheeted and then laid upon the center to form an even layer, or plurality of layers, either by laying on and cutting with shears to join the edges and remove the superfluous stock in the manner well known to the art for laying and joining sheeted stocks, or I may mold the fiberized stock into thin hemispherical parts and bring two of these together over the cemented center.

I next superpose a layer of a compound of rubber of a softer and more yieldable character than that of the center, and in applying this layer I may use the method described above in connection with applying the fiberized layer. I next vulcanize this cover portion over the center in a suitable mold for a time and at a temperature which does not impair the center. To this end I may employ in the compounds of these layers an organic accelerator in the usual manner.

The layer of a compound of softer character than the center 1 forms a clinging or gripping surface for the gut strings of the racket.

It will be understood that the somewhat hard or stiff character of the center—necessary for right behavior—does not afford a surface which can seat itself upon the gut of the racket or afford that clinging or gripping effect which is required for control. The layer of softer rubber does this and thus successfully supplies this function of the felt cover.

The markings upon the surface, the use of which is optional, furnish the skin friction of a felt cover. They also contribute in some degree to the gripping or clinging action, upon the racket.

After curing as above, the ball is cleansed and coacted with a white rubber paint, or mineralized cement, comprising, preferably a rubber solution with a volatile solvent and as a pigment lithopone or zinc oxid. This is best applied by dipping. When dry this paint is fixed by a vapor cure.

Instead of making a distinct layer of fiberized compound 2, I can get the reinforcing effect of the fiber by mixing it into the compound of the center 1 or of the softer rubber layer 3, or in both, distributing it so that I require a less proportion in each compound, but I can get a better air-retaining effect by the construction first described.

I may also, as an alternative for the white rubber paint, mix the whitening pigments with the soft layer 3, or use a white pigmented compound laid upon the layer 3 before curing, but I get a whiter color by use of the rubber paint applied as described.

I may also lay up, before curing, all of the elements, 1, 2 and 3, and cure them at one cure. In this case I use the accelerator in the compound for the center 1, and thus get the greater cure required for that element—omitting the accelerator from the other compound or compounds.

Other forms of markings for the softer outer layer may be substituted for the depressed markings, such as raised markings or pebbling.

It will be understood that the employment of the layers of rubber compound, particularly the outer softer rubber layer greatly increases the air retaining properties of the ball over that of a ball with the usual center and a felt cover.

I may substitute for the layer or layers of fiberized compound 2 a layer or layers of frictioned fabric.

I have made balls which played well without any intermediate fiber or frictioned fabric layer by modifying the compounds and cures to get the non-distensibility in that way, such ball consisting of the center 1 of rubber and the covering layer 3 of rubber, these layers being of different degrees of hardness with the softer outside.

It will be observed that a ball of my construction is built up without stitching at any point thereof, one layer being superimposed on the other and united integrally therewith by curing. The softer rubber exterior cover is not intended to function as a means for preventing distention of the ball, this function being performed by the harder ball center 1, and when the intermediate layer is used this functions as the means for holding the ball to size and shape.

The main function of the exterior softer coating is to provide for a proper surface to coact with the gut of the racket in making the different plays or strokes made by expert players.

In laying on a plurality of layers of the fiberized compound 2 in segments or sections these may be arranged to break joints each with the joints of the other layer or layers of the same compound.

The foregoing specification is presented in a descriptive sense the various features mentioned not being included as limitations on the scope of the invention, which is defined by the following claims.

What I claim is:

1. A tennis ball comprising a hollow center of rubber compound and an outer layer or rubber compound, the latter being softer than the compound of the center, substantially as described.

2. A tennis ball comprising a hollow center of rubber compound, an outer layer of rubber compound, softer than that of the hollow center, and an intermediate layer composed of rubber and fibrous material, substantially as described.

3. A tennis ball comprising a hollow center of rubber, an outer layer of rubber compound softer than that of the center, and a rubber paint coating on the softer exterior layer, substantially as described.

4. A tennis ball comprising a hollow center of rubber compound, an outer layer of rubber compound softer than that of the center, and an intermediate layer composed of rubber and fibrous material free from stitching, substantially as described.

5. A tennis ball comprising a hollow center of rubber compound and an outer layer of rubber compound softer than that of the center and having high and low surface portions, substantially as described.

6. A tennis ball comprising a hollow center of rubber compound, an outer layer of rubber compound softer than that of the center, and an intermediate layer composed of rubber and fibrous material free from stitching, said softer layer having high and low surface portions.

7. A hollow tennis ball having a wall composed of rubber and fabric and of substantially the ordinary resiliency and thickness of a tennis ball wall, said ball having on its exterior low portions consisting of depressions formed in the normal thickness of the said resilient wall and distributed over its entire surface, substantially as described.

In testimony whereof, I affix my signature.

ADDISON T. SAUNDERS.